Sept. 13, 1932.  H. A. DOUGLAS  1,876,872
ELECTRIC SWITCHING MECHANISM
Filed Feb. 6, 1928
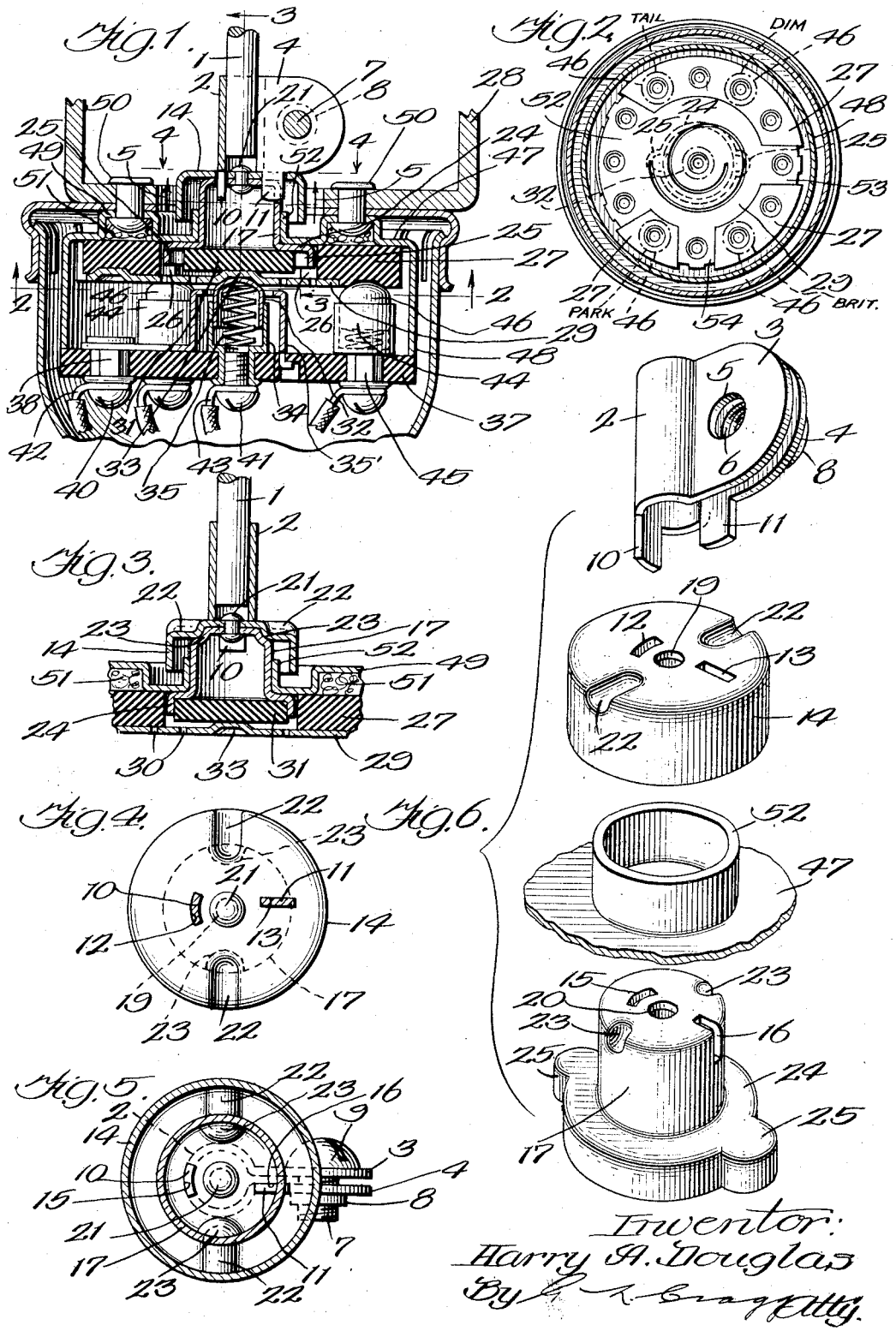
Inventor:
Harry A. Douglas
By [signature] Atty.

Patented Sept. 13, 1932

1,876,872

UNITED STATES PATENT OFFICE

HARRY A. DOUGLAS, OF BRONSON, MICHIGAN

ELECTRIC SWITCHING MECHANISM

Application filed February 6, 1928. Serial No. 252,282.

My invention relates to electric switching mechanism and to couplings employing the same and is of particular service in connection with the switching mechanism disclosed in my copending application Serial No. 252,279, filed February 6, 1928, though the invention is not to be restricted to any particular use.

In accordance with one characteristic of my invention a clamp is formed of folded sheet metal having a socket at its bight for the reception of a part to be coupled, the sides of the clip that extend from the socket being separable due to the resilience of the clip, there being means, such as a clamping bolt that may be passed through the clip sides and beyond the socket, whereby said clip sides may be drawn together to grip the clip upon the part that is within the socket. The clip is provided with at least one prong and preferably two prongs whereby it may be assembled with another part that is to be coupled with the aforesaid part, said prong or prongs being so disposed with relation to the clip as not to interfere with the relative movability of the clip sides. Where two prongs are employed, one constitutes a structural continuation of the bight of the clip and the other a structural continuation of one of the clip sides, the other clip side being thus free of any obstruction by the prongs to its movability toward and from the first clip side.

In accordance with another characteristic of the invention the prongs pass through the end wall of an inverted cup which serves as a hood to shield one of the two parts that are coupled by the clip.

In another aspect, my invention comprises a switch operating rod, prongs upon one end of said rod and extending longitudinally of the rod, and a switch operating member having openings receiving said prongs, whereby said member is turned when said rod is turned.

The invention has other characteristics and will be more fully explained in connection with the accompanying drawing in which Fig. 1 is a sectional view illustrating a switch structure having features disclosed in my aforesaid ports and in which switch structure a switch operating rod is coupled with a contact actuator or carrier by the device of my present invention; Figs. 2, 3, 4 and 5 are sectional views respectively taken on lines 2—2, 3—3, 4—4 and 5—5 of Fig. 1; and Fig. 6 shows the parts of the structure of my invention in perspective.

As set forth in my said copending application, the rod 1 passes upwardly through a hollow steering shaft to the top side of a hand operated steering wheel fixed upon the upper end of this shaft. This rod has a handle upon its upper end whereby the rod may be depressed to close a horn or signaling circuit and may be turned to adjust the lighting circuits.

A clip is clamped upon the lower end of the rod, this clip being formed of spring sheet metal folded into U-form and in a manner to provide a socket 2 of arcuate curvature that snugly receives and is coaxial with the rod. The clip is extended from the longitudinal edges of the socket into flat clip sides 3 and 4 which have holes 5 and 6 formed therethrough, the hole 6 having screw threads upon its interior. The screw threaded stem 7 of a bolt is passed through these holes and screwed into said threads. The nut 8 is screwed upon the bolt stem and draws the bolt head 9 toward each other to contract the split socket 2 into tight clamping engagement with the end of the rod that is within the socket. The mid portion of the socket, that is the bight portion of the clip, is continued lengthwise of the socket into an assembling prong 10 with respect to which both sides of the clip are equally movable. One of the flat clip sides, the clip side 4 as shown, is provided with a prong continuation 11. Said prongs both extend along the axis of the socket and rod and do not interfere with the relative movability of the flat clip sides. These prongs pass respectively through the openings 12 and 13 formed in the end wall of an inverted cup shaped hood 14, the adjacent or base portion of the clip being in thrusting engagement with said cup end wall. Said prongs also respectively pass through openings 15 and 16 in the invered cup shaped switch operating member 17. Central holes 19 and 20 are respectively formed through the top or end walls of the cups 14 and 17 to receive a rivet 21 that couples these cup walls. The top of the cup shaped hood or shield 14 is depressed into diametrically opposite lugs 22 that are received in diametrically opposite notches 23 that are formed in the annular corner of cup 17. Said prongs are thus in turning engagement with both members 14 and 17 and said members are in direct turning engagement with each other to prevent relative turning movement thereof in case the prongs are somewhat loose in the openings 12, 13, 15, 16. The cup 17 has a bottom inverted cup shaped flange 24 which has diametrically opposite ears 25 which are slidingly received within diametrically opposite grooves 26 that are enlargements of a hole formed centrally within an insulating ring 27.

As set forth in my aforesaid copending application, the switching mechanism which is controlled by the rod 1 is carried at the lower end of a bracket structure 28 which is carried upon the lower end of the stationary steering column. A spring 29 presses upon the rod 1 longitudinally of its axis to normally maintain this rod in the uppermost position along the axis of this rod. This spring is also a contact actuator, this actuator being also preferably a contact carrier to which end this spring is in the form of a resilient metallic plate through which a spiral slot 30 is cut around the axis of the rod 1 whereby the central portion of the plate constitutes a flat spring tongue which, by virtue of its resiliency, is normally constrained to remain within the general plane of the plate. A disc 31 of insulation is received in socket or cup 24 and pressed upon by the top side of the central spring tongue portion of the plate 29. The upper end of a metallic plunger contact 32 is received in the inverted cup shaped recess 33 that is centrally formed in the plate 29. The contact 32 is received within a metallic spring barrel 34 which also receives a coiled spring 35 which presses upwardly upon the contact 32, the spring 35 cooperating with the spring tongue portion of the plate 29 in maintaining the rod 1 in its uppermost position. The plunger contact 32 and the metallic spring barrel 34 are surrounded by a metallic housing 35' which has a lateral extension 36 that is clamped against a contact carrying insulating disc 37 by means of a sleeve rivet 38. The spring barrel 34, itself, has a hollow sleeve continuation 39 which is also riveted to the disc 37. Binding screws 40 and 41 are screwed into said sleeves 38 and 39 to clamp circuit wires 42 and 43 in mechanical and electrical connection with said sleeves. The wire 42 is grounded through the horn or other signaling device. The wire 43 is grounded through a battery. When the rod 1 is depressed, the spiral spring tongue at the central portion of the plate 29 is depressed into engagement with the metallic housing 35' whereupon the signaling device operates. When the pressure upon the rod is relieved, the plate 29 and the coiled spring 35 restore the rod 1 to its uppermost position.

Other metallic spring barrels 44 are provided with sleeve extensions 45 which are also secured to the disc 37. These spring barrels contain springs which press upwardly upon the plunger contacts 46 that pertain to the lighting circuits, these contacts, in turn, pressing upwardly against the insulating ring 27 or against the plate 29, according to the position to which this ring is turned consequent upon turning the rod. Said spring pressed contacts 32, 46 press the ring 27 against the uppermost or end wall 47 of an inverted cup whose cylindrical wall 48 surrounds the ring 27 and the disc 37, this disc constituting a closure that is clinched upon the rim of the cup. The cup wall 47 has an annular extension 49 which is secured to the bracket structure 28 by the rivets 50. Waterproof packing 51 is contained in the annular channel that is defined within said annular extension 49.

The plate 29 is provided with fingers which are clinched into engagement with the ring 27. When said rod 1 is turned, the socket 24, through the intermediation of its ears 25 and the recesses 26, turns the ring 27 to adjust the lighting circuits, this ring being preferably confined to a fixed plane of rotation, the signaling circuit being closable merely by depressing the central portion of the plate 29 without any consequent depression of the ring 27.

The prongs 10 and 11 need not be clinched as the springs in the spring barrels 34, 44 and the spring plate 29 keep the end wall of cup 14 against the clip socket 2 and clip sides 3, 4. The cup end wall 47 has an upwardly extending tubular continuation 52 which serves as a bearing for the slotted cup 17. The cylindrical hood 14 overlies and extends laterally beyond the bearing 52 to guard against the entry of foreign matter to the switch casing.

Changes may be made without departing from the invention.

Having thus described my invention, I claim:

1. A coupling member formed of spring sheet metal folded into a U and having a socket portion at its bight and flat sides extending from said socket portion and having a prong at the bight and another prong upon one of the flat sides; and a clamping device for drawing one of said flat sides toward the other.

2. A coupling member formed of spring sheet metal folded into a U and having a socket portion at its bight and flat sides extending from said socket portion and having a prong at the bight and another prong upon one of the flat sides; and a clamping device for drawing one of said flat sides toward the other, said prongs extending longitudinally of said socket.

3. A coupling member formed of spring sheet metal folded into a U and having a socket portion at its bight and flat sides extending from said socket portion and having a prong at the bight and another prong upon one of the flat sides; a clamping device for drawing one of said flat sides toward the other; and a second coupling member having openings receiving said prongs.

4. A coupling member formed of spring sheet metal folded into a U and having a socket portion at its bight and flat sides extending from said socket portion and having a prong at the bight and another prong upon one of the flat sides; a clamping device for drawing one of said flat sides toward the other, said prongs extending longitudinally of said socket; and a second coupling member having openings receiving said prongs.

5. The combination with a rotatable rod; of a spring metal clip clamped upon one end of said rod, said clip having prongs extending longitudinally of the rod; a member having openings receiving said prongs whereby said member is turned when said rod is turned; and a spring pressing upon said member to maintain it and said prongs in assembly.

In witness whereof, I hereunto subscribe my name.

HARRY A. DOUGLAS.